US008244909B1

(12) United States Patent
Hanson et al.

(10) Patent No.: US 8,244,909 B1
(45) Date of Patent: Aug. 14, 2012

(54) METHOD, APPARATUS AND NETWORKING EQUIPMENT FOR PERFORMING FLOW HASHING USING QUASI CRYPTOGRAPHIC HASH FUNCTIONS

(75) Inventors: Peter Hanson, Fremont, CA (US); Glen Anderson, Mountain View, CA (US)

(73) Assignee: Google Inc., Mountain View, CA (US)

( * ) Notice: Subject to any disclaimer, the term of this patent is extended or adjusted under 35 U.S.C. 154(b) by 505 days.

(21) Appl. No.: 12/487,383

(22) Filed: Jun. 18, 2009

(51) Int. Cl.
*G06F 15/173* (2006.01)

(52) U.S. Cl. ........ 709/238; 711/216; 713/176; 370/235; 714/762; 708/252

(58) Field of Classification Search .................. 709/238; 370/389, 235; 711/216; 380/46, 47, 268; 713/168, 176; 714/762; 708/252
See application file for complete search history.

(56) References Cited

U.S. PATENT DOCUMENTS

| | | | | |
|---|---|---|---|---|
| 4,677,623 A * | 6/1987 | Iwasaki et al. | | 714/762 |
| 5,363,448 A * | 11/1994 | Koopman et al. | | 713/170 |
| 5,577,124 A * | 11/1996 | Anshel et al. | | 380/46 |
| 5,828,752 A * | 10/1998 | Iwamura et al. | | 380/46 |
| 6,111,877 A * | 8/2000 | Wilford et al. | | 370/392 |
| 6,292,483 B1 * | 9/2001 | Kerstein | | 370/389 |
| 6,690,667 B1 * | 2/2004 | Warren | | 370/389 |
| 6,888,797 B1 * | 5/2005 | Cao et al. | | 370/235 |
| 2002/0085712 A1 * | 7/2002 | Gennaro | | 380/46 |
| 2006/0221930 A1 * | 10/2006 | Sweeney et al. | | 370/351 |
| 2008/0063187 A1 * | 3/2008 | Yoshida et al. | | 380/28 |
| 2008/0181103 A1 * | 7/2008 | Davies | | 370/230 |
| 2008/0222420 A1 * | 9/2008 | Serret-Avila | | 713/176 |
| 2008/0281892 A1 * | 11/2008 | Hemming | | 708/252 |
| 2009/0041049 A1 * | 2/2009 | Scott et al. | | 370/419 |
| 2009/0136022 A1 * | 5/2009 | Langendoerfer et al. | | 380/28 |
| 2009/0323956 A1 * | 12/2009 | Tsunoo et al. | | 380/268 |
| 2010/0023726 A1 * | 1/2010 | Aviles | | 711/216 |

* cited by examiner

*Primary Examiner* — Ario Etienne
*Assistant Examiner* — Michael C Lai
(74) *Attorney, Agent, or Firm* — Lerner, David, Littenberg, Krumholz & Mentlik, LLP

(57) ABSTRACT

A method, apparatus and networking equipment for performing flow hashing is provided. The method may include obtaining, at a network node, a key for a packet; forming, at the network node, a first pseudorandom number as a function of a first polynomial generator and the key; forming, at the network node, a second pseudorandom number as a function of a second polynomial generator and the key; combining, at the network node, the first and second pseudorandom numbers to form a third pseudorandom number; and selecting, at the network node, as a function of the third pseudorandom number, a path to which to forward the packet.

30 Claims, 8 Drawing Sheets

METHOD, APPARATUS AND NETWORKING EQUIPMENT FOR PERFORMING FLOW HASHING USING QUASI CRYPTOGRAPHIC HASH FUNCTIONS

BACKGROUND

Communication networks have experienced an enormous rise in volume of data traffic over the past decade. This trend is expected to continue due to a growing popularity of the Internet and an emergence of new applications that utilize such networks. As a result, proper utilization of network resources, such as bandwidth, has become ever so important.

In addition to the rising traffic volumes, there has also been an evolution in the underlying networks. From physical layer and up, network topologies have become more mesh-like, allowing multiple diverse paths between source and destination nodes. A high degree of connectedness in a network allows networking equipment to share traffic load ("load sharing") across multiple diverse paths, and hence, better network utilization. Theoretically, such load sharing can be achieved through congestion-aware routing algorithms and/or multipath routing.

In addition to multipath routing, the networking equipment can be configured to statistically distribute the data traffic over a set, N, of its forwarding interfaces, ports, or bins (collectively "interfaces") to achieve a greater aggregate transmission bandwidth than one of such forwarding interfaces. This practice is known variously as "link aggregation," "port trunking," "port teaming," and/or "load sharing." The goal of these techniques is to logically bond the set, N, of forwarding interfaces together to achieve N times as much transmit bandwidth. To achieve this, each packet that the networking equipment forwards is mapped to one of the set, N, of forwarding interfaces in a uniform manner (i.e., no one of the set, N, of forwarding interfaces can be systematically preferred over another).

One way to provide load balancing over the paths and/or forwarding interfaces while maintaining ordering constraints of dataflows is to assign packets of a dataflow to one of the multiple paths or forwarding interfaces based on results of "hash function" operations or, simply, "flow hashing". Flow hashing maps an input "key" formed from salient features of the dataflow (commonly referred to as "flow identifiers") to an output hash digest having fewer bits. The hash digest is then mapped to one of the paths or forwarding interfaces between 0 and N−1.

Hash functions for performing flow hashing are generally characterized by uniformity, implementation area, and computation time. Uniformity can be assessed by comparison to a random assignment. That is, if two randomly selected keys differ, then there should be a 50% probability that their hash digests will be different. Cyclic Redundancy Check ("CRC") is the hash function generally recognized as being suitable for high-performance, high-integration hardware implementations. The CRC and like-type hash functions, when evaluated over real-world network packets, however, may exhibit severe non-uniformity. The non-uniformity arises because real-world keys are not distributed in a uniform, random manner. Commonly, the flow identifiers contained in the keys, e.g., MAC or IP addresses, are sequential in nature.

SUMMARY

A method, apparatus and network equipment for performing flow hashing is provided. The method may include obtaining, at a network node, a key for a packet; forming, at the network node, a first pseudorandom number as a function of a first polynomial generator and the key; forming, at the network node, a second pseudorandom number as a function of a second polynomial generator and the key; combining, at the network node, the first and second pseudorandom numbers to form a third pseudorandom number; and selecting, at the network node, as a function of the third pseudorandom number, a path to which to forward the packet.

BRIEF DESCRIPTION OF THE DRAWINGS

So the manner in which the above recited features are attained and can be understood in detail, a more detailed description is described below with reference to Figures illustrated in the appended drawings.

The Figures in the appended drawings, like the detailed description, are examples. As such, the Figures and the detailed description are not to be considered limiting, and other equally effective examples are possible and likely. Furthermore, like reference numerals in the Figures indicate like elements, and wherein.

DETAILED DESCRIPTION

In the following detailed description, numerous specific details are set forth in order to provide a thorough understanding of example embodiments or other examples described herein. However, it will be understood that these embodiments and examples may be practiced without the specific details. In other instances, well-known methods, procedures, components and circuits have not been described in detail, so as not to obscure the following description. Further, the embodiments and/or examples disclosed are for exemplary purposes only and other embodiments and/or examples may be employed in lieu of or in combination with the embodiments disclosed.

Overview

In one aspect, the method, apparatus and networking equipment may render a forwarding decision to select, from multiple available communication paths or links, a communication path or link over which to forward a dataflow. In another aspect, the method, apparatus and networking equipment may render such forwarding decision responsive to performing flow hashing using quasi-cryptographic hash functions.

Example Architecture

Figure 1A:
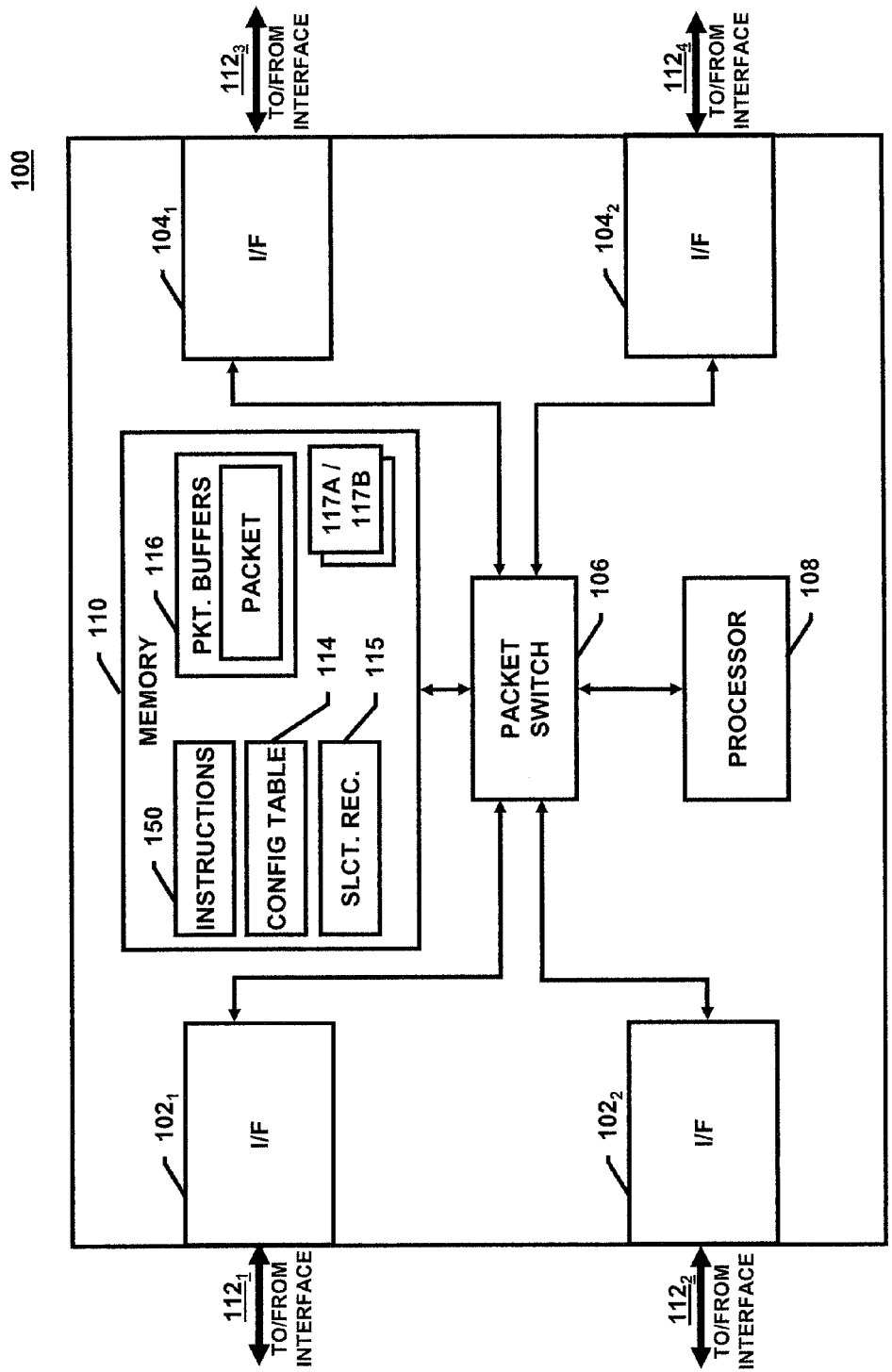
FIGS. 1A, 1B and 1C are block diagram illustrating example networking equipment in accordance with one or more aspects.
Figure 1B:
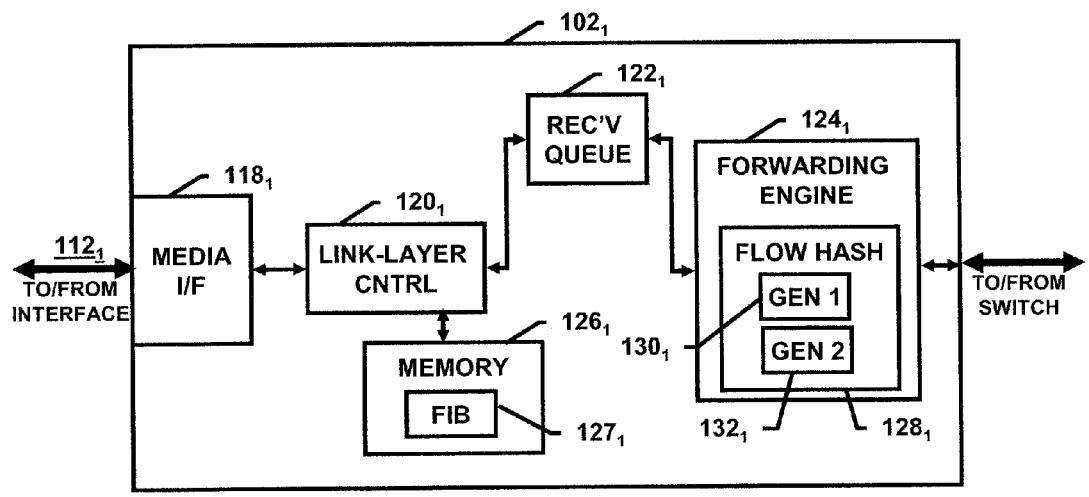
Figure 1B:
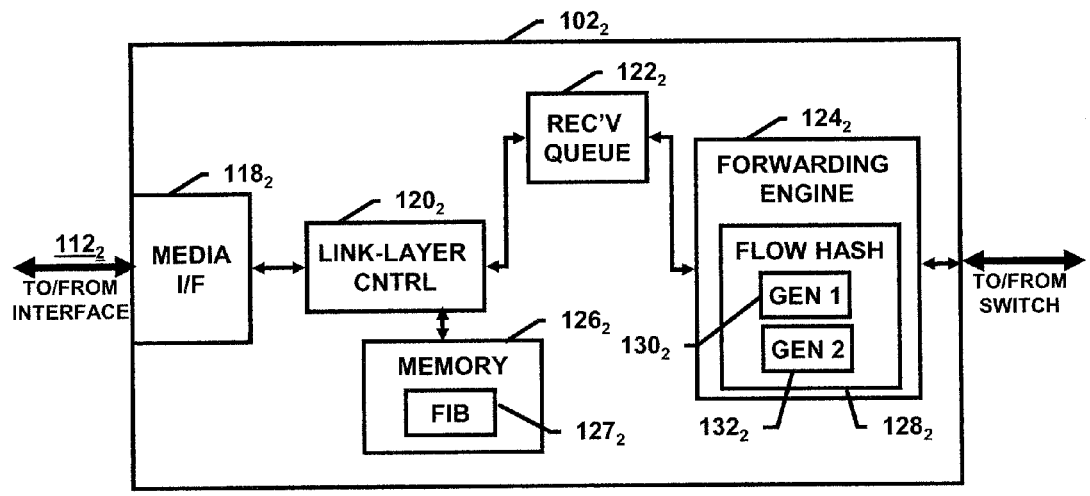
Figure 1C:
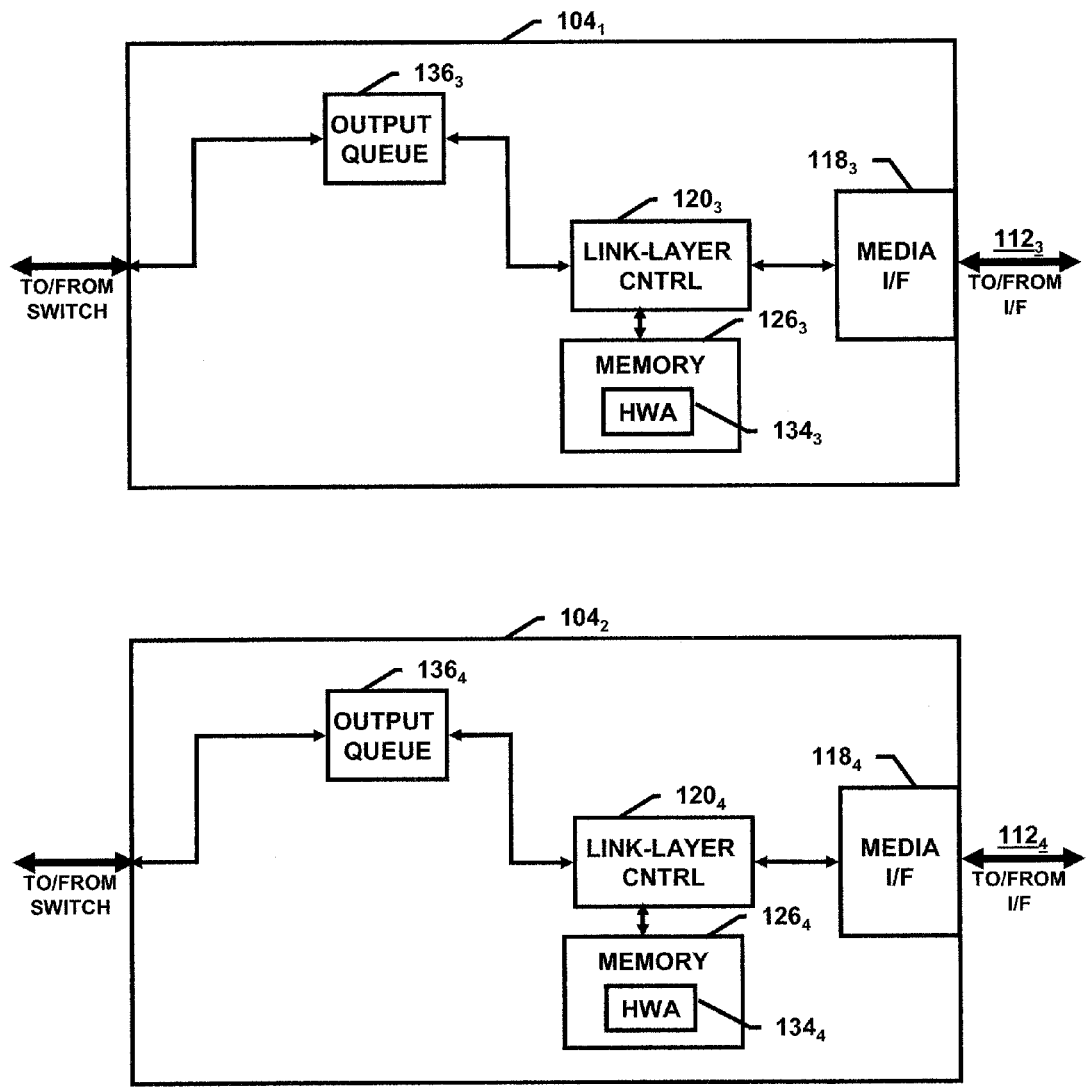

FIGS. 1A, 1B and 1C are block diagram illustrating an example networking equipment 100 in accordance with one or more aspects. The networking equipment 100 may be any of a router, switch, bridge, hub, etc. As described in more detail below, the networking equipment 100 may operate as one (e.g., an access or intermediate node) of a plurality of interconnect nodes of an internetwork of a larger network.

The larger network may be, for example, any of a wide area network ("WAN"), metropolitan area network ("MAN"), campus area network ("CAN") and a global area network ("GAN"). In general, the larger network may include a plurality of geographically distributed client nodes or subnetworks (e.g., local area networks or "LANs") communicatively coupled via the internetwork.

As part of the internetwork, the networking equipment 100 may carry out a number of functions to facilitate communication of data traffic among the client nodes. These functions may include receiving, via first and second communication links $112_1$, $112_2$, first and second dataflows originated from first and second client ("source") nodes, respectively, for termination to another client ("destination") node. The functions may also include rendering forwarding decisions to select, from a set of paths to the destination node, first and second paths ("selected paths") to which to forward the first and second dataflows, respectively. The functions may further include forwarding the first and second dataflows, via third and fourth communication links $112_3$, $112_4$, to first and second "next hop" interconnect nodes along the first and second selected paths, respectively.

To carry out its functions, the networking equipment 100 (and elements thereof) may be configured to communicate in accordance with one or more communication protocols. These communication protocols are generally dictated by communication protocols of the network, and may be any standardized, proprietary, open-source, and freely-available communication protocols for communicating data traffic in packet data networks. For example, the communication protocols may be the Internet Protocol ("IP") suite of protocols ("IP protocols") or, alternatively, protocols that conform or are otherwise amendable to the Open Systems Interconnection ("OSI") Reference Model. For simplicity of exposition, the following assumes that the networking equipment 100 and elements thereof (and, in turn, the network) are configured to communicate in accordance with the IP protocols.

The networking equipment 100 may include a number of elements; most of which are not shown for simplicity of exposition. As shown, the networking equipment 100 includes a first and second ingress network interfaces ("ingress interfaces") $102_1$, $102_2$, first and second egress network interfaces ("egress interfaces") $104_1$, $104_2$, a packet switch 106, one or more processors (collectively "processor") 108 and memory 110.

The memory 110 may include a plurality of storage locations that are addressable by the processor 108, ingress interfaces $102_1$-$102_2$, egress interfaces $104_1$-$104_2$ and packet switch 106. These storage locations may be adapted to store, for example, one or more of programmable and/or hard-coded, executable instructions, commands, directions, code, directives and/or control data (collectively, "instructions") 150 and a number of data structures.

Architecturally, the memory 110 may be or employ random access memory ("RAM"), such as any of dynamic random access memory ("DRAM"), synchronous DRAM ("SDRAM"), content addressable memory ("CAM") and variations thereof. It will be apparent to those skilled in the art that the memory 110 may also include other types of storage media, including cache, read-only memory, optical storage, magnetic storage, removable storage, erasable programmable read only memory and variations thereof, flash memory, disk drive storage, any combination thereof, and the like, for storing the instructions and data structures pertaining to the operation of the networking equipment 100.

The data structures may include, for example, a table, cache or other structure ("configuration table") 114 that stores configuration and/or provisioning parameters, settings and the like. These configuration parameters may include, for example, respective pluralities of media access control ("MAC") addresses and IP addresses assigned or otherwise associated with the ingress interfaces $102_1$-$102_2$ and egress interfaces $104_1$-$104_2$.

The data structures may also include an interface-selection record 115. In general, the interface-selection record 115 includes information that indicates selection of the first and second egress interfaces $104_1$, $104_2$ for forwarding the first and second dataflows to the first-next-hop and second-next-hop nodes, respectively. The interface-selection record 115 may include first and second entries. The first entry maps a code for selecting the first egress interface $104_1$ to an identifier of the first egress interface $104_1$ ("first-egress identifier"). The second entry maps a code for selecting the second egress interface $104_2$ to an identifier of the second egress interface $104_2$ ("second-egress identifier").

The code for selecting the first egress interface $104_1$ (hereinafter "first-selection code") and the first-egress identifier may be stored as the first entry responsive to the forwarding decision to select the first selected path for the first dataflow. Analogously, the code for selecting the second egress interface $104_2$ (hereinafter "second-selection code") and the second-egress identifier may be stored as the second entry responsive to the forwarding decision to select the second selected path for the second dataflow.

The first-selection code may be a most significant byte ("MSB") of a hash digest associated with the first dataflow ("first-flow hash digest"), and the second-selection code may be a MSB of a hash digest associated with the second dataflow ("second-flow hash digest"). The first-selection and second-selection codes may be other portions of the first-flow and second-flow hash digests, as well.

In addition to the configuration table 114 and the interface-selection record 115, a portion of the memory 110 may be organized as a shared "pool" of packet buffers 116. The packet buffers 116 may queue packets extracted from frames of the first and second dataflows received via the ingress interfaces $102_1$, $102_2$, respectively. The packet buffers 116 may also, responsive to the forwarding decisions, dequeue such first-flow-received and second-flow-received packets to the egress interfaces $104_1$, $104_2$ so as to form first-flow-forwarded and second-flow-forwarded packets, respectively. To facilitate enqueing and dequeing of the packet buffers 116, a portion of the memory 110 may be organized as two First-In-First-Out ("FIFO") queues 117a, 117b. These FIFO queues 117a, 117b may store memory locations (i.e., "descriptors") to the buffered packets, and each of the FIFO queues ("descriptor FIFOs") 117a, 177b may be implemented, for example, as a ring of memory buffers.

As described in more detail below, the egress interfaces $104_1$, $104_2$ may form first-flow-forwarded and second-flow-forwarded frames from the first-flow-forwarded and second-flow-forwarded packets, respectively. Each frame of the first-flow-received, second-flow-received, first-flow-forwarded and second-flow-forwarded frames may be defined in accordance with the IP protocols. Pursuant to the IP protocols, each frame may include "payload" data encapsulated within a series of nested network headers that include information that enables efficient forwarding (and/or routing) to the destination node. More specifically, each frame includes a packet encapsulated within a data-link (layer 2) header. The packet, in turn, includes a datagram encapsulated within an internetwork (layer 3) header, and the datagram includes the payload data encapsulated in a transport (layer 4) header.

The data-link header typically includes two medium access control ("MAC") addresses, namely, source and destination MAC addresses. For each of the first-flow-received frames, the destination-MAC address is the MAC address of the first-ingress interface $102_1$, and the source-MAC address is a MAC address of a network interface of the first source node or a last hop interconnect node providing such received frame. For each of the second-flow-received frames, the destination-MAC address is the MAC address of second-ingress interface $102_2$, and the source-MAC address is a MAC address of a network interface of the second source node or a last hop interconnect node providing such received frame.

For each of the first-flow-forwarded frames, the source-MAC address is the MAC address of the first-egress interface $104_1$, and the destination-MAC address is a MAC address of a network interface of the destination node or the first-next-hop node. For each of the second-flow-forwarded frames, the source-MAC address is the MAC address of the second-egress interface $104_2$, and the destination-MAC address is a MAC address of a network interface of the destination node or the second-next-hop node. The data-link header may also include flow control, frame synchronization and error checking information used to manage data transmissions over the communication links $112_1$-$112_4$.

The internetwork header may provide information defining a logical path (or "virtual circuit") through the internetwork. Notably, this logical path may span multiples of the communication links (not shown). The internetwork header may include source and destination IP addresses assigned to or otherwise associated with the source and destination nodes, respectively. These source and destination IP addresses allow the each packet to "hop" from node to node along the logical path until it reaches the destination node. As described in more detail below, the source and destination MAC addresses in the data-link headers may be updated after each hop, as necessary. However, the source and destination IP addresses typically remain unchanged.

The transport header may provide information for ensuring that the datagram is reliably transmitted from the source node to the destination node. The transport header may include, among other things, source and destination port numbers that respectively identify particular applications executing in the source and destination nodes. More specifically, the source port number is assigned to the source-node application that generates the datagram, and the destination port number is assigned to the destination-node application to which datagram is to be delivered.

The transport header may also include error-checking information (i.e., a checksum) and dataflow control information. For instance, in connection-oriented transport protocols, such as Transmission Control Protocol ("TCP"), the transport header may store sequencing information that indicates a relative position of the datagram within its corresponding dataflow.

The ingress interfaces $102_1$-$102_2$ and egress interfaces $104_1$-$104_2$ may include respective mechanical, electrical and signaling circuitries for communicatively coupling to and exchanging the data traffic with respective the communication links $112_1$-$112_4$. The first and second ingress interfaces $102_1$-$102_2$ may include, for example, respective media interfaces $118_1$, $118_2$; link-layer-protocol ("LL") controllers $120_1$, $120_2$; receive queues $122_1$, $122_2$; forwarding engines $124_1$, $124_2$; and local memories $126_1$, $126_2$, as shown, for example, in FIG. 1B.

The first-ingress memory $126_1$ may include a local forwarding table or forwarding information base ("FIB") $127_1$. The first-ingress FIB $127_1$ may include routing information for routing the first-flow-received packets. This routing information may be distributed to the network equipment 100, and in turn, to the first-ingress FIB $127_1$ by way of congestion-aware routing protocols. The congestion-aware routing protocols may include, for example, an Open Shortest Path First ("OSPF") protocol, and/or multipath routing protocols, including any of equal-cost multipath ("ECMP") and optimized multipath ("OMP") protocols.

The routing information may indicate that two alternative paths to the destination node exist; one via the third communication link $112_3$, and the other via the fourth communication link $112_4$. These first and second paths may be, for example, shortest paths to the destination node. It is to be understood that "shortest paths" generally refer to cheapest paths under cost metrics chosen by any of an OSPF, ECMP, OMP, and like-type algorithm.

The first-ingress-media interface $118_1$ in general includes application-specific circuitry, logic and/or combinations of hardware and software configured as a physical (layer 1) interface between the first communication link $112_1$ and the first-ingress-LL controller $120_1$. For example, the first-ingress-media interface $118_1$ may include one or more ports, associated busses and any layer 1 protocol stacks for interconnecting the first-ingress-LL controller $120_1$ and the first communication link $112_1$.

The first-ingress-LL controller $120_1$ may employ or may be embodied in hardware as a field-programmable gate array ("FPGA") or an application-specific integrated circuit ("ASIC") configured to carry out the link-layer-protocol processing of the first-flow-received frames. Alternatively, some or all functionality of first-ingress-LL controller $120_1$ may be implemented in various combinations of hardware and/or software. In that regard, the software (not shown) may be stored in the first-ingress-memory $126_1$. Functions and operations of the first-ingress-LL controller $120_1$ are described in more detail below.

The first-receive queue $122_1$ may store, buffer and/or queue the first-flow-received packets prior to the first-flow-received packets being transferred to the packet buffers 116. The first-receive queue $122_1$ may be a FIFO queue, which may be implemented, for example, as a ring of memory buffers.

The first forwarding engine $124_1$ may be embodied in hardware as a FPGA or an ASIC, and in general, includes instructions for performing a number of functions to facilitate forwarding of the first-flow-received packets. These functions may include, for example, carrying out transfers of the first-flow-received packets from between the first-receive queue $122_1$ and the packet buffers 116. The functions may also include performing internetwork (layer 3) processing of the first-flow-received packets, and interfacing with the packet switch 106 to cause the forwarding of the first-flow-received packets.

As an alternative to being implemented in hardware, some or all of such functionality of the first forwarding engine $124_1$ may be implemented in various combinations of hardware and/or software. This software (not shown) may be stored in the first-ingress-memory $126_1$ as well.

The first forwarding engine $124_1$ may further include application-specific circuitry, logic and/or combinations of hardware and software for performing flow-hashing (collectively "flow-hashing logic") $128_1$. The first-ingress-flow-hashing logic $128_1$ may include first and second polynomial generators $130_1$, $132_1$.

The first and second polynomial generators $130_1$, $132_1$ may be, for example, n-bit and m-bit hash functions, respectively, where n<>m. Examples of the n-bit and m-bit hash functions may include respective n-bit and m-bit cyclic redundancy checks ("CRCs"), maximum length sequences and like-type pseudorandom number generators. The first and second polynomial generators $130_1$, $132_1$ may be implemented as respective linear feedback shift registers and/or other combinational logic. Like the first-ingress-LL controller $120_1$, functions and operations of the first forwarding engine $124_1$ are described in more detail below.

The second ingress interface $102_2$ (and elements thereof) may be the same or substantially the same as the first ingress interface $102_1$, except that second ingress interface $102_2$ may process the second-flow-received frames and packets. For avoidance of repetition, the architecture second ingress interface $102_2$ and elements thereof are not separately described. Functions and operations of the second ingress interface $102_2$ and elements thereof are described in more detail below.

The first and second egress interfaces $104_1$-$104_2$ may include, for example, respective media interfaces $118_3$, $118_4$; LL controllers $120_3$, $120_4$; hardware-address ("HWA") tables $134_3$, $134_4$; output queues $136_3$, $136_4$; and local memories $126_3$, $126_4$, as shown in FIG. 1C. The first-egress-media interface $118_3$ in general includes application-specific circuitry, logic and/or combinations of hardware and software configured as a physical (layer 1) interface between the third communication link $112_3$ and the first-egress-LL controller $120_3$. The first-egress-media interface $118_3$ may include, for example, one or more ports, associated busses and any layer 1 protocol stacks for interconnecting the first-egress-LL controller $120_3$ and the third communication link $112_3$.

The first-egress-LL controller $120_3$ may employ or may be embodied in hardware as a FPGA or an ASIC configured to perform the link-layer-protocol processing for the first-flow-forwarded frames. Alternatively, some or all functionality of first-egress-LL controller $120_3$ may be implemented in various combinations of hardware and/or software. The software (not shown) may be stored in the first-egress-memory $126_3$. Functions and operations of the first-egress-LL controller $120_3$ are described in more detail below.

The first-egress-HWA table $134_3$ may be stored in the first-egress-memory $126_3$, and may include MAC addresses of other interconnect nodes directly coupled to the third communication link $112_3$, such as the MAC address of the first-next-hop node. The first-egress-HWA table $134_3$ may be maintained by the first-egress-LL controller $120_3$; e.g., by examining the third communication link $112_3$ in accordance with Address Resolution Protocol ("ARP"). The MAC address of the first-next-hop node may be used along with the MAC address of the first egress interface $118_3$ to form the first-flow-received frames from the first-flow-forwarded packets dequeued from the packet buffers 116.

The first-output queue $136_3$ may store, buffer and/or queue the first-flow-received frames while awaiting forwarding from the first egress interface $104_1$. To facilitate this, the first-output queue $136_3$ may be a FIFO queue, which may be implemented as a ring of memory buffers, for instance.

The second egress interface $104_2$ (and elements thereof) may be the same or substantially the same as the first egress interface $104_1$, except that second egress interface $104_2$ may process the second-flow-forwarded frames and packets. For avoidance of repetition, the second egress interface $104_2$ and elements thereof are not separately described. Functions and operations of the second egress interface $104_2$ and elements thereof are described in more below.

The packet switch 106 communicatively couples to each of the first and second ingress interfaces $102_1$, $102_2$; the first and second egress interfaces $104_1$, $104_2$; the processor 108 and memory 110 via respective local buses. Via such busses, the packet switch 106, processor 108, packet buffers 116 and first forwarding engine $124_1$ may operate in combination as a shared memory data processor for switching the first-flow-received packets from the first ingress interface $102_1$ to the first egress interface $104_1$. Analogously, the packet switch 106, processor 108, packet buffers 116 and second forwarding engine $124_2$ may operate in combination as a shared memory data processor for switching the second-flow-received packets from the second ingress interface $102_2$ to the second egress interface $104_2$.

Alternatively, the packet switch 106 may be a hardware switch executed under control of the processor 108. In this regard, the packet buffers 116 may be optional.

While the foregoing describes the ingress interfaces $102_1$-$102_2$ communicatively coupled to different nodes via multiple diverse paths, the ingress interfaces $102_1$-$102_2$ may be logically bonded or "link aggregated" to communicatively couple with the previous-hop node. Similarly, the egress interfaces $104_1$-$104_2$ may be logically bonded or "link aggregated" to communicatively couple with one of the first and second next-hop nodes.

Although illustrated and described as including network interfaces having either ingress architecture and functionality or egress architecture and functionality, the networking equipment 100 typically includes network interfaces in which each network interface has both ingress and egress architecture and functionality. In that regard, such network interface may include non-redundant elements of the ingress and egress interfaces illustrated and described. In addition, the networking equipment 100 may include more or fewer than four interfaces, and may be capable of supporting more than two dataflows and two paths to the destination node.

Example Forwarding Operation

Figure 2:
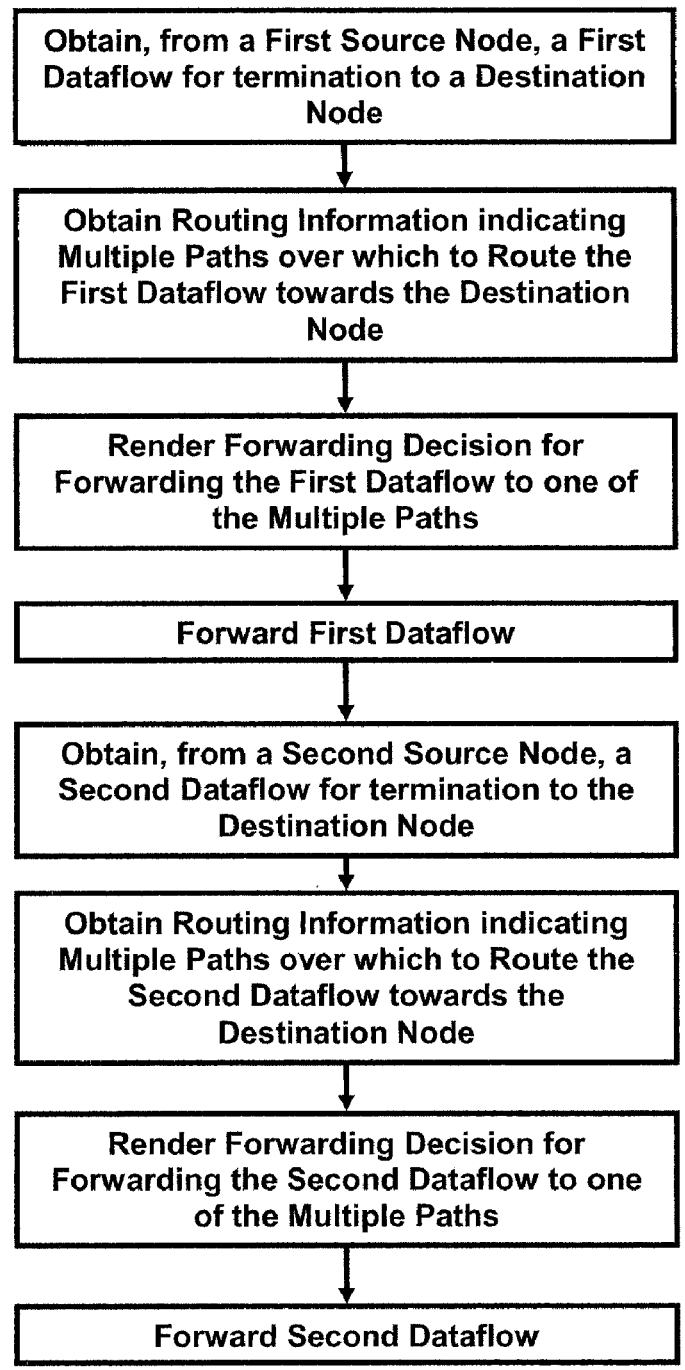
FIG. 2 is a flow diagram illustrating an example flow for performing forwarding operations in accordance with one or more aspects.
Figure 3:
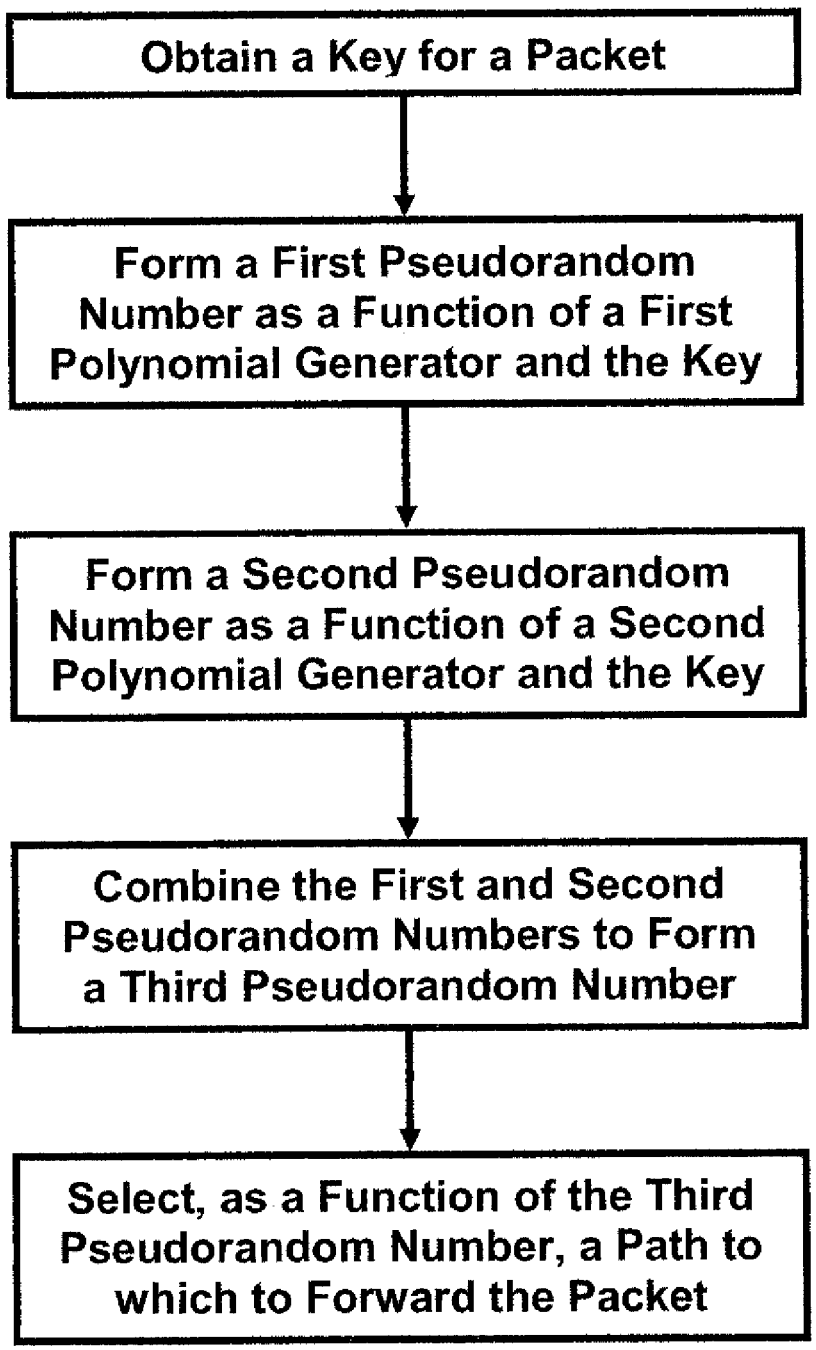
FIG. 3 is a flow diagram illustrating an example flow for performing flow hashing in accordance with one or more aspects.

In addition to operations illustrated in FIGS. 2-3, various operations in accordance with a variety of aspects are described as follows. It should be understood that such various operations might not be performed in the precise order described below. Rather, the various operations can be handled in an alternative order, reverse order or simultaneously.

An example forwarding operation may be carried out as follows. Initially, the first ingress interface $102_1$, or more particularly, the first-ingress-media interface $118_1$ may receive via the first communication link $112_1$ a signal carrying one or more frames of the first dataflow. The first-ingress-media interface $118_1$ may, in turn, processes the signal so as to extract the first-flow-received frames. The first-ingress-media interface $118_1$ may then output the first-flow-received frames to the first-ingress-LL controller $120_1$.

Thereafter, the first-ingress-LL controller $120_1$ may process the first-flow-received frames in accordance with the link-layer protocol. This may include, the first-ingress-LL controller $120_1$ examining each of the first-flow-received frames for frame integrity (e.g., size, checksum, address, etc.). Responsive to the examination, the first-ingress-LL controller $120_1$ discards any of first-flow-received frames that lack integrity. Conversely, the first-ingress-LL controller $120_1$ may continue processing the first-flow-received frames that do not lack integrity.

Pursuant to such continued processing, the first-ingress-LL controller $120_1$ may convert the first-flow-received frames to the first-flow-received packets by stripping the link-layer headers. After stripping the headers, the first-ingress-LL controller $120_1$ may pass (or drain) the first-flow-received packets into the first-receiving queue $122_1$ on a FIFO basis.

The first forwarding engine $124_1$ may then drain the first-flow-received packets from the first-receiving queue $122_1$ into the packet buffers 116 one by one on a FIFO basis. The processor 108, in turn, may store in the descriptor FIFO 117a descriptors to the first-flow-received packets queued in the packet buffers 116. In this manner, the descriptor FIFO 117a records a relative order in which the first-flow-received packets are received.

Assuming the drain begins with a first-received or "initial" packet of first-flow-received packets, the first forwarding engine $124_1$ may read various portions of the internetwork and transport headers of the initial first-flow-received packet. Thereafter, the first forwarding engine $124_1$ checks the various portions to ensure the initial first-flow-received packet is not damaged or illegal. The first forwarding engine $124_1$ may discard the initial first-flow-received packet if found to be damaged or illegal, and then repeat the check for subsequent first-flow packets until one is found that is not damaged or illegal.

The first forwarding engine $124_1$ may then extract from the internetwork and transport headers of initial first-flow-received packet one or more portions that operate as identifiers of the first dataflow ("first-flow identifiers"). The first-flow identifiers may include, for example, the source and destination IP addresses and the protocol identifier arranged, for example, as a 3-tuple. The 3-tuple may be ordered as {source IP address, destination IP address, protocol ID} or any other permutation of the source IP address, destination IP address and protocol ID.

Alternatively, the first-flow identifiers may include the 3-tuple along with the source and destination port addresses. In this regard, the first-flow identifiers may be arranged as a 5-tuple. The 5-tuple may be ordered as {source IP address, destination IP address, protocol ID, source port address, destination port address} or any other permutation of the source IP address, destination IP address, protocol ID, source port address and destination port address.

One extracted, the first forwarding engine $124_1$ may store the first-flow identifiers into the first-ingress memory $126_1$ for subsequent processing by the first-ingress-flow-hashing logic $128_1$. Thereafter, the first forwarding engine $124_1$ may access, and use the first-flow identifiers to query the first-ingress FIB $127_1$ for the routing information for the first dataflow. Responsive to the query, the first-ingress FIB $127_1$ returns the routing information that identifies the two available paths to which the initial first-flow-received packet may be routed. The first forwarding engine $124_1$ may, in turn, receive the routing information returned by the first-ingress FIB $127_1$.

Responsive to the routing information, the first forwarding engine $124_1$ may perform a number of processes for rendering the forwarding decision for the initial first-flow-received packet (and in turn, the rest of the first dataflow). The first forwarding engine $124_1$ may invoke the flow-hashing logic $128_1$ to flow hash the initial first-flow-received packet.

After being invoked, the flow-hashing logic $128_1$ may query the first-ingress memory $126_1$ for the first-flow identifiers. The first-ingress memory $126_1$ may return, for example, the 5-tuple. In turn, the flow-hashing logic $128_1$ may receive the 5-tuple for use, in subsequent processing, as a key for the first dataflow ("first-flow key").

Alternatively, the flow-hashing logic $128_1$ may combine the first-flow identifiers with a seed to form the first-flow key. For example, the flow-hashing logic $128_1$ may prepend or otherwise append the seed to the first-flow identifiers. The flow-hashing logic $128_1$ may, alternatively or additionally, mathematically alter the first-flow identifiers with the seed. By way of example, the flow-hashing logic $128_1$ may use Boolean operators (such as XOR) to combine the first-flow identifiers with the seed to obtain the first-flow key.

In response to obtaining the first-flow key, the flow-hashing logic $128_1$ may form a first pseudorandom number or hash digest (collectively "raw digest"). To form the first raw digest, the flow-hashing logic $128_1$ may execute a hash function using the first polynomial generator $130_1$ (e.g., the n-bit CRC) as a divisor for the first-flow key.

After forming the first raw digest, the flow-hashing logic $128_1$ may form a second raw digest. Analogous to the first raw digest, the flow-hashing logic $128_1$ may form the second raw digest by executing a hash function using the second polynomial generator $132_1$ (e.g., the m-bit CRC) as a divisor for the first-flow key.

Responsive to the second hash digest, the flow-hashing logic $128_1$ may combine the first-raw and second-raw digests to form the first-flow hash digest. The flow-hashing logic $128_1$ may, alternatively and/or additionally, form the first-flow hash digest by combining a configurable code with the first raw digest and/or the second raw digest. The configurable code may be derived from any of the first polynomial generator $130_1$, second polynomial generator $132_1$ and/or another polynomial generator. By way of example, the configurable code may be one of a finite number of unique rotations of the first polynomial generator $130_1$, second polynomial generators $132_1$ or other polynomial generator.

The flow-hashing logic $128_1$ may use any of polynomial addition, polynomial multiplication, polynomial subtraction, modulo and finite field operations to combine the first second raw digest or to combine the configurable code with the first raw digest and/or second raw digest. One benefit of combining the first raw digest, second raw digest and/or configurable codes in this way is that the resulting first-flow hash digest tends to be substantially non-linear, and in turn, has good uniformity.

After forming the first-flow hash digest, the flow-hashing logic $128_1$ may form the first-selection code by extracting, for example, the MSB of such first-flow hash digest. Thereafter, the flow-hashing logic $128_1$ may store the first-selection code in the first entry of the selection record 115. The first forwarding engine $124_1$, in turn, may obtain the first-egress identifier from the first-ingress FIB $127_1$, and store it along with the first-selection code in the first entry of the selection record 115.

The first forwarding engine $124_1$ may thereafter pass the first-egress identifier to the packet switch 106 as part of a request for the packet switch 106 to establish a connection to the first egress interface $104_1$. By passing the first-egress identifier and requesting the connection to the first egress interface $104_1$, the first forwarding engine $124_1$ renders the forwarding decision for the initial first-flow-received packet.

In response to the request, the packet switch 106 under control of the processor 108 dequeues the initial first-flow-received packet from the packet buffers 116 and passes it to the first egress interface $104_1$. In addition, the packet switch 106 dequeues from the descriptor FIFO 117a and enqueues into the descriptor FIFO 117b the descriptor corresponding to initial first-flow-received packet.

Upon receipt at the first egress interface $104_1$, the first-egress-LL controller $120_3$ consults the first-egress-HWA table $134_3$ to obtain the MAC address of the first-next-hop node. The first-egress-LL controller $120_3$ also consults the configuration table 114 to obtain the MAC address of the first egress interface $104_1$. The first-egress-LL controller $120_3$ may then form a link-layer header using the MAC address of the first-next-hop node and the MAC address of the first egress interface $104_1$, and encapsulate the initial first-flow-received packet in such header to form the initial first-flow-forwarded frame. The first-egress-LL controller $120_3$ may then store the initial first-flow-forwarded frame into the first-egress output queue $136_3$, whereupon it is scheduled for delivery.

Sometime thereafter, the initial first-flow-forwarded frame is forwarded from the first egress interface $104_1$. Responsive to the forwarding of the initial first-flow-forwarded frame, the packet switch 106 dequeues the descriptor from the descriptor FIFO 117b.

Each subsequent first-flow-received packet may be forwarded as follows. As above, the first forwarding engine $124_1$ may read various portions of the internetwork and transport headers of the first-flow-received packet. Thereafter, the first forwarding engine $124_1$ checks such various portions to ensure the first-flow-received packet is not damaged or illegal. The first forwarding engine $124_1$ may discard the first-flow-received packet if found to be damaged or illegal, and then repeat the check for subsequent first-flow packets until one is found that is not damaged or illegal.

The first forwarding engine $124_1$ may then extract the first-flow identifiers from the internetwork and transport headers of the first-flow-received packet. One extracted, the first forwarding engine $124_1$ may store the first-flow identifiers into the first-ingress memory $126_1$ for subsequent processing by the first flow-hashing logic $128_1$. The first forwarding engine $124_1$ may invoke the flow-hashing logic $128_1$ to flow hash the first-flow-received packet.

After being invoked, the flow-hashing logic $128_1$ may query the first-ingress memory $126_1$ for the first-flow identifiers for the first-flow-received packet. The first-ingress memory $126_1$ may return such first-flow identifiers. In turn, the flow-hashing logic $128_1$ may receive the first-flow identifiers. As an alternative to a state-full operation (i.e., the first forwarding engine $124_1$ extracting and storing the first-flow identifiers for retrieval by the flow-hashing logic $128_1$), the flow-hashing logic $128_1$ may extract or otherwise obtain the first-flow identifiers from the first-flow-received packet. Thereafter, the flow-hashing logic $128_1$ may use the first-flow identifiers, in subsequent processing, as the first-flow key. The flow-hashing logic $128_1$ may, alternatively and/or additionally, combine the first-flow identifiers with a seed to form the first-flow key as described above.

After obtaining the first-flow key, the flow-hashing logic $128_1$ may form the first raw digest by executing a hash function using the first polynomial generator $130_1$ (e.g., the n-bit CRC) as a divisor for the first-flow key. The flow-hashing logic $128_1$ may also form the second raw digest by executing a hash function using the second polynomial generator $132_1$ (e.g., the m-bit CRC) as a divisor for the first-flow key.

Thereafter, the flow-hashing logic $128_1$ may combine the first and second raw digests or combine the configurable code with the first raw digest and/or second raw digest to form the first-flow hash digest, as above.

After forming the first-flow hash digest, the flow-hashing logic $128_1$ may extract its MSB. The flow-hashing logic $128_1$ may then perform one or more lookups of the selection record 115 to find a match between the first-selection code and the first-flow hash digest. In responsive to the lookups, the flow-hashing logic $128_1$ may obtain the first-egress identifier. The flow-hashing logic $128_1$ may then pass its first-egress identifier to the first forwarding engine $124_1$.

The first forwarding engine $124_1$ may thereafter pass the first-egress identifier to the packet switch 106 as part of a request for the packet switch 106 to establish a connection to the first egress interface $104_1$. As above, the first forwarding engine $124_1$ renders the forwarding decision for the first-flow-received packet as a result of passing the first-egress identifier and requesting the connection to the first egress interface $104_1$.

In response to the request, the packet switch 106 under control of the processor 108 dequeues the first-flow-received packet from the packet buffers 116 and passes it to the first egress interface $104_1$. As above, the packet switch 106 dequeues from the descriptor FIFO 117a and enqueues into the descriptor FIFO 117b the descriptor corresponding to first-flow-received packet.

Upon receipt at the first egress interface $104_1$, the first-egress-LL controller $120_3$ consults the first-egress-HWA table $134_3$ to obtain the MAC address of the first-next-hop node. The first-egress-LL controller $120_3$ also consults the configuration table 114 to obtain the MAC address of the first egress interface $104_1$. The first-egress-LL controller $120_3$ may then form a link-layer header using the MAC address of the first-next-hop node and the MAC address of the first egress interface $104_1$, and encapsulate the first-flow-received packet in such header to form the first-flow-forwarded frame. The first-egress-LL controller $120_3$ may then store the initial first-flow-forwarded frame into the first-egress output queue $136_3$, whereupon it is scheduled for delivery.

Sometime thereafter, the first-flow-forwarded frame is forwarded from the first egress interface $104_1$. Responsive to the forwarding of the first-flow-forwarded packet, the packet switch 106 dequeues the descriptor from the descriptor FIFO 117b.

While the networking equipment 100 is processing the first dataflow, the second ingress interface $102_2$, or more particularly, the second-ingress-media interface $118_3$ may receive via the first communication link $112_3$ a signal carrying one or more frames of the second dataflow. The second-ingress-media interface $118_2$ may, in turn, processes the signal so as to extract the second-flow-received frames. The second-ingress-media interface $118_2$ may then output the second-flow-received frames to the second-ingress-LL controller $120_2$.

The portions of the networking equipment 100 for processing the second dataflow function and/or operate in the same or substantially the way as described above with respect to the processing the first dataflow, except as described below.

Assuming the drain of the second-receive queue $122_2$ begins with an initial packet of the second-flow-received packets, the first forwarding engine $124_1$ may extract from the internetwork and transport headers of the initial second-flow-received packet one or more portions that operate as identifiers of the second dataflow ("second-flow identifiers"). Like the first-flow identifiers, the second-flow identifier may include the source and destination IP addresses and the protocol identifier arranged as a 3-tuple, and/or the source IP address, destination IP address, protocol ID, source port address, destination port address arranged as a 5-tuple. The second-flow identifiers differ from the first-flow identifiers as a result of the source IP address being associated with the second source node instead of the first source node.

One extracted, the second forwarding engine $124_2$ may store the second-flow identifiers into the second-ingress memory $126_2$ for subsequent processing by the second-ingress-flow-hashing logic $128_2$. Thereafter, the first forwarding engine $124_2$ may access, and use the second-flow identifiers to query the second-ingress FIB $127_2$ for the routing information for the second dataflow. Responsive to the query, the second-ingress FIB $127_2$ returns the routing information that identifies one available path to which the initial second-flow-received packet may be routed. The second forwarding engine $124_2$ may, in turn, receive the routing information returned by the second-ingress FIB $127_2$.

Responsive to the routing information, the second forwarding engine $124_2$ may perform a number of processes for rendering the forwarding decision for the initial second-flow-received packet (and in turn, the rest of the second dataflow). The second forwarding engine $124_1$ may invoke the flow-hashing logic $128_2$ to flow hash the initial second-flow-received packet.

After being invoked, the second flow-hashing logic $128_2$ may query the second-ingress memory $126_2$ for the second-flow identifiers. The second-ingress memory $126_2$ may return, for example, second-flow identifiers arranged as a 5-tuple. In turn, the second flow-hashing logic $128_2$ may receive the 5-tuple for use, in subsequent processing, as a key for the second dataflow ("second-flow key").

The flow-hashing logic $128_2$ may combine the second-flow identifiers with a seed to form the second-flow key. The flow-hashing logic $128_2$ may, for example, prepend or otherwise append the seed to the second-flow identifiers. The flow-hashing logic $128_1$ may, alternatively or additionally, mathematically alter (e.g., use Boolean operators to combine) the second-flow identifiers with the seed.

After obtaining the first-flow key, the second flow-hashing logic $128_2$ may form the first raw digest by executing a hash function using the first polynomial generator $130_2$ (e.g., the n-bit CRC) as a divisor for the second-flow key. After forming the first raw digest, the second flow-hashing logic $128_2$ may form the second raw digest by executing a hash function using the second polynomial generator $132_2$ (e.g., the m-bit CRC) as a divisor for the first-flow key.

Responsive to the second hash digest, the second flow-hashing logic $128_2$ may combine the first and second raw digests to form the second-flow hash digest. The flow-hashing logic $128_2$ may, alternatively and/or additionally, form the second-flow hash digest by combining a configurable code with the first raw digest and/or the second raw digest. This configurable code may be derived from any of the first polynomial generator $130_2$, second polynomial generator $132_2$ and/or another polynomial generator. For example, the configurable code may be one of a finite number of unique rotations of the first polynomial generator $130_2$, second polynomial generators $132_2$ or other polynomial generator.

The second-hashing logic $128_2$ may, for example, use any of polynomial addition, polynomial multiplication, polynomial subtraction, modulo and finite field operations to combine the first and second raw digests or to combine the configurable code with the first raw digest and/or second raw digest.

After forming the second-flow hash digest, the second flow-hashing logic $128_2$ may form the second-selection code by extracting, for example, the MSB of such second-flow hash digest. Thereafter, the second flow-hashing logic $128_2$ may store the second-selection code in the second entry of the selection record 115. The second forwarding engine $124_2$, in turn, may obtain the second-egress identifier from the second-ingress FIB $127_2$, and store it along with the second-selection code in the second entry of the selection record 115.

The second forwarding engine $124_2$ may thereafter pass the second-egress identifier to the packet switch 106 as part of a request for the packet switch 106 to establish a connection to the second egress interface $104_2$. By passing the second-egress identifier and requesting the connection to the second egress interface $104_2$, the second forwarding engine $124_2$ renders the forwarding decision for the initial second-flow-received packet. Each subsequent second-flow-received packet may be forwarded in the same or substantially the same way as described above with respect to forwarding the subsequent first-flow-received packet.

Example Network Architecture

Figure 4:
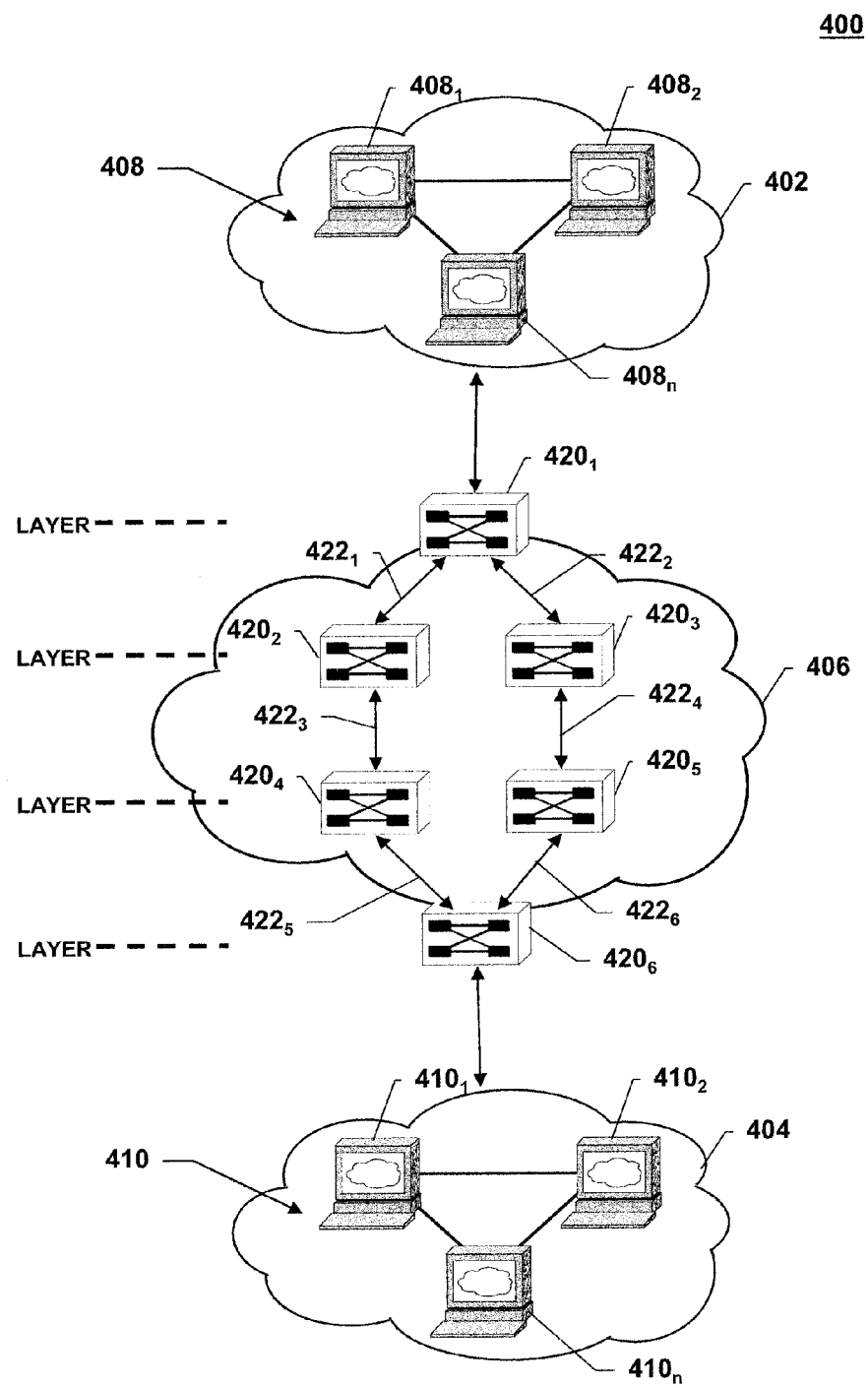
FIG. 4 is a block diagram illustrating example network architecture in accordance with one or more aspects.

FIG. 4 is a block diagram illustrating an example network 400 in accordance with one or more aspects. The network 400 may be a partial or full deployment of most any communication or computer network, including any of a public or private, terrestrial wireless or satellite, or wireline network. The network 400 may include first and second subnetworks 402, 404 communicatively coupled via an internetwork 406. To facilitate communication of data traffic within the network 400, the first and second subnetworks 402, 404 and the internetwork 406 (and nodes thereof) may be configured to communicate using any of the aforementioned communication protocols.

Each of the first and second subnetworks 402, 404 may be, for example, a local area network ("LAN") or any other type of subnetwork. The first and second subnetworks 402, 404 may include respective collections 408, 410 of end-station nodes ("first-subnet nodes") $408_1$-$408_n$, ("second-subnet nodes") $410_1$-$410_n$.

The first-subnet nodes $408_1$-$408_n$ may originate dataflows to or terminate dataflows from the second-subnet nodes $410_1$-$410_n$ via the internetwork 406. Analogously, the second-subnet nodes $410_1$-$410_n$ may originate dataflows to or terminate dataflows from the first-subnet nodes $108_1$-$108_n$ via the internetwork 406.

The internetwork 406 may include a collection of interconnect nodes $420_1$-$420_6$ communicatively coupled via communication links $422_1$-$422_6$. Each of the interconnect nodes $420_1$-$420_6$ may be the network equipment 100 of FIG. 1, and may include alternative flow-hashing logic; examples of which are as described in more detail below.

Each of the communication links $422_1$-$422_6$ may be, for example, any of a point-to-point link, Ethernet link, wireless link, optical link, Etherchannel or other channel of aggregated links and the like. The interconnect nodes $420_1$-$420_6$ and communication links $422_1$-$422_6$ may be arranged in multiple layers (four of which are shown) so to provide multiple available communication paths and/or interfaces from which to select a communication path or link over which to forward each dataflow flowing between the first and second subnetworks 402, 404.

To allow each of the interconnect nodes $420_1$-$420_6$ or each layer of the network 400 to render independent forwarding decisions, each of such nodes $420_1$-$420_6$ or layers of the network 400 uses a unique version of the configurable code described herein. By doing so, the interconnect nodes $420_1$-$420_6$ or layers of the network 400 may operate as collective hashing system that enables uniformly distributed forwarding decisions at every hop along the multiple available communication paths and/or interfaces.

Although the internetwork 406, as shown, includes six interconnect nodes and six communication links, the internetwork 406 may include more or fewer interconnect nodes, and correspondingly, more or fewer communication links. In addition, the interconnect nodes and communication links may be arranged in more than or fewer than four layers, and provide more than or fewer than paths. Alternatively and/or additionally, the interconnect nodes and communication links may be arranged as a mesh, fully-connected or other type network.

Alternative Flow Hashing Examples

As illustrated and described herein, the method, apparatus and networking equipment may render forwarding decisions responsive to performing flow hashing using various quasi-cryptographic hash functions. Each of these various quasi-cryptographic hash functions may be implemented in small implementation areas, and exhibit low computation time (i.e., low latency). In addition, the various quasi-cryptographic hash functions may have good uniformity over real-world dataflow packets.

Figure 5:
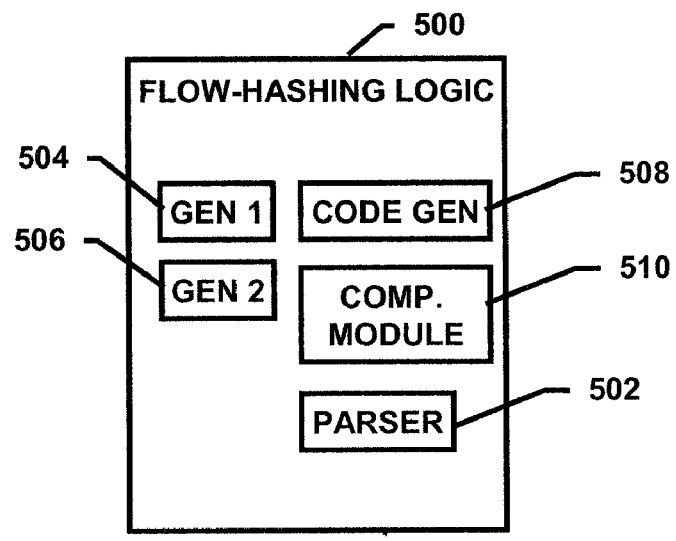
FIG. 5 is a block diagram illustrating example flow-hashing logic in accordance with one or more aspects.

FIG. 5 is a block diagram illustrating example flow-hashing logic 500 in accordance with one or more aspects. The flow-hashing logic 500 is described with reference to the networking equipment 100 of FIG. 1 and the network 400 of FIG. 4, for simplicity of exposition. The flow-hashing logic 500 may be used in other architectures as well.

The flow-hashing logic 500 may include a parser 502, first and second polynomial generators 504, 506, a generator for forming a rotation code ("rotation-code generator") 508, and a computation module 510. The parser 502 may be embodied in hardware as application-specific circuitry and/or logic configured to parse or otherwise extract flow identifiers from internetwork and/or transport headers of a dataflow packet. Alternatively, some or all functionality of the parser 502 may be implemented in various combinations of hardware and/or software.

The first and second polynomial generators 504, 506 may be embodied as application-specific circuitry, logic and/or various combinations of hardware and software configured to generate respective hash digests. For example, the first and second polynomial generators 504, 506 may be implemented as respective linear feedback shift registers ("LSFRs").

The first and second polynomial generators 504, 506 may be, for example, two primitive hash functions, O(n), having the same period, $2^n-1$, and a given cross-correlation. Examples of the first and second hash functions may include respective n-bit CRCs, maximum length sequences and like-type pseudorandom number generators.

The first polynomial generator 504, as a result of being primitive, may be configured to generate $2^n-1$ unique rotations ("first-polynomial rotations"). Like the first polynomial generator 504, the second polynomial generator 506 may be configured to generate $2^n-1$ unique rotations ("second-polynomial rotations").

The rotation-code generator 508 may be embodied in as application-specific circuitry, logic and/or various combinations of hardware and software configured to generate a code ("rotation code") equal to one of the first-polynomial rotations. The computation module 510 may be embodied in as application-specific circuitry, logic and/or various combinations of hardware and software configured to perform various calculations.

Operationally, the flow-hashing logic 500 may pass a received dataflow packet to the parser 502. The parser 502 may then parse the flow identifiers from the internetwork and/or transport headers of the dataflow packet, and arrange them, for example, as the 5-tuple, so as to form the flow key. The parser 502 may pass the flow key to the computation module 510.

The computation module 510 may, in turn, compute a first raw hash digest, X1, as follows:

$$X1 = \text{key} * x^n | G1 \quad (1)$$

where, key is the flow key, G1 is the first polynomial generator 504, $\text{key}*x^n$ is carried out using Galois field of two elements ("GF(2)") polynomial multiplication, and $x^n|G1$ is carried out using $x^n$ modulo GF(2) polynomial G1.

The computation module 510 may then compute a second raw hash digest, X2, as follows:

$$X2 = \text{key} * x^n | G2 \quad (2)$$

where, key is the flow key, G2 is the second polynomial generator 506, $\text{key}*x^n$ is carried out using GF(2) polynomial multiplication, and $x^n|G2$ is carried out using $x^n$ modulo GF(2) polynomial G2.

Thereafter, the computation module 510 may pass the first raw hash digest, X1, to the rotation-code generator 508. The rotation-code generator 508, in turn, may generate the rotation code, R, as follows:

$$R = X1 * x[k] | G1 \quad (3)$$

where, X1 is the first raw hash digest, G1 is the first polynomial generator 504, and $X1*x[k]|G1$ is carried out using GF(2) polynomial multiplication modulo GF(2) polynomial G1 (which simulates an effect of multiplying by x for k iterations).

The computation module 510 may thereafter compute one of a family of hash digests or "Gold Codes", H(G), as the flow hash digest as follows:

$$H(G) = X1 * R + X2 | G1 \quad (4)$$

where, X1 is the first raw hash digest; R is the rotation code; X2 is the second raw hash digest; $X1*R$ is carried out using GF(2) polynomial multiplication to form Y; $X2|G1$ is carried out using X2 modulo GF(2) polynomial G1 to form Z; and $Y+Z$ is carried out using polynomial addition.

Once computed, the computation module 510 may pass the flow hash digest to the flow-hashing logic 500. The flow-hashing logic 500 may use the flow hash digest to render the forwarding decisions, as described above.

The flow-hashing logic 500 may be used to construct indefinite numbers of unique digests, H(G) (limited only by the period of the first and second polynomial generators 504, 506). To allow each of the interconnect nodes $420_1$-$420_4$ or each layer of the network 400 to render independent forwarding decisions, each of the interconnect nodes $420_1$-$420_4$ or each layer of the network 400 uses a unique, nonzero bit patterns for the rotation code, R. By doing so, the flow-hashing logic 500 may generate unique delays, and in turn, choose unique members of the constructed family of unique digests, H(G). As an alternative, the rotation code, R, may be a zero bit pattern (i.e., R=0), even though it is not a rotation. R=0 selects the G2 code, which is also defined to be a member of the constructed family, H(G). In terms of implementation area, the flow-hashing logic 500 may construct the family of unique digests, H(G), with a pair of small polynomial generators and a modest multiplication block.

As an alternative to multi-cycle, bit sequenced architecture noted above, the parser 502, first and second polynomial generators 504, 506, code generator 508 and computation module 510 may be implemented as one or more arrays of logic gates and/or random logic adapted to carry out the functionality of the flow-hashing logic 500 in a single cycle.

Figure 6:
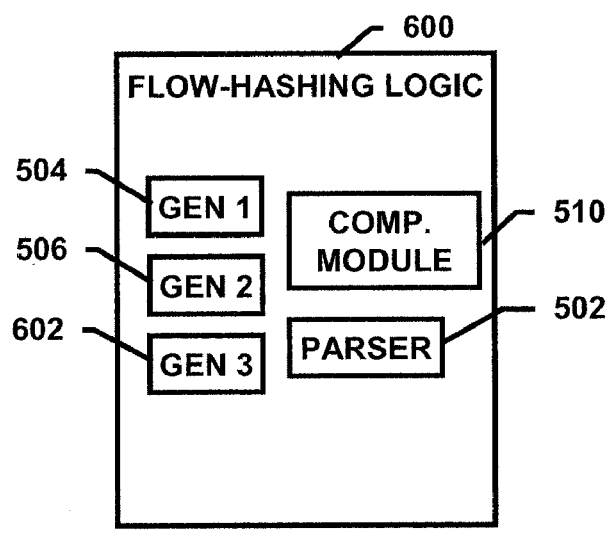
FIG. 6 is a block diagram illustrating example flow-hashing logic in accordance with one or more aspects.

FIG. 6 is a block diagram illustrating an example flow-hashing logic 600 in accordance with one or more aspects. The flow-hashing logic 600 is similar to the flow-hashing logic 500 of FIG. 5, except as described herein.

The flow-hashing logic 600 may include the parser 502, the first and second polynomial generators 504, 506, the computation module 510 and a third polynomial generator 602. The third polynomial generator 602 may be, for example, a primitive hash function, O(m), having the period relatively prime to the periods of the first and second polynomial generators 504, 506. The period of the third polynomial generator 602 may be, for example, $2^m-1$, where m=n-1. Examples of the third hash functions may include an m-bit CRC, maximum length sequence and like-type pseudorandom number generator. The third polynomial generator 602, as a result of being primitive, may be configured to generate $2^m-1$ unique rotations ("third-polynomial rotations").

Operationally, the flow-hashing logic 600 may pass a received dataflow packet to the parser 502. The parser 502 may then parse the flow identifiers from the internetwork and/or transport headers of the dataflow packet, and arrange them, for example, as the 5-tuple, so as to form the flow key. The parser 502 may pass the flow key to the computation module 510.

The computation module 510 may compute the first and second raw hash digests, X1 and X2, as noted above. The computation module 510 may then compute a third raw hash digest, Xr, as follows:

$$Xr = \text{key} * x^n | G3 \qquad (5)$$

where, key is the flow key, G3 is the third polynomial generator 602, $\text{key} * x^n$ is carried out using GF(2) polynomial multiplication, and $x^n | G3$ is carried out using $x^n$ modulo GF(2) polynomial G3.

Thereafter, the computation module 510 may convert the third raw hash digest, Xr, to a pseudorandom rotation code, R, as follows:

$$R = Xr * x + 1 \qquad (6)$$

where, Xr is the third raw hash digest, and $Xr*x+1$ is carried out using GF(2) polynomial multiplication followed by polynomial addition with 1. The computation module 510 may thereafter compute one of a family of hash digests, H(QG), as the flow hash digest as follows:

$$H(QG) = X1 * R + X2 | G1 \qquad (7)$$

where, X1 is the first raw hash digest; R is the pseudorandom rotation code; X2 is the second raw hash digest; $X1*R$ is carried out using GF(2) polynomial multiplication to form Y; $X2|G1$ is carried out using X2 modulo GF(2) polynomial G1 to form Z; and Y+Z is carried out using polynomial addition.

Once computed, the computation module 510 may pass the flow hash digest to the flow-hashing logic 600. The flow-hashing logic 600 may use the flow hash digest to render the forwarding decisions, as described above.

The flow-hashing logic 600 may be used to construct indefinite numbers of unique digests, H(QG) (limited only by the periods of the first, second and third polynomial generators 504, 506 and 602). To allow each of the interconnect nodes $420_1$-$420_4$ or each layer of the network 400 to render independent forwarding decisions, each of the interconnect nodes $420_1$-$420_4$ or each layer of the network 400 computes, on a packet-by-packet basis, one of the unique pseudorandom rotation codes, R. The pseudorandom rotation code, R, is used to generate unique delays, and in turn, choose unique members of the constructed family of unique digests, H(QG).

Using the unique pseudorandom rotation code, R, to select among a large number of other linear hash digests, namely X1 and X2, results in the flow hash digest being very long, substantially nonlinear, and in turn, exhibiting good uniformity. Changing any bit in the unique pseudorandom rotation code, R, may result in a nearly random hash syndrome, provided any other differences exist in the flow key. This allows seed information to be treated just like any other part of the flow key, ensuring that unique keys generate unique hash functions.

Because the period of the third polynomial generator 602 is relatively prime to the period of the first and second polynomial generators 504, 506, then every possible rotation of every state of the constructed family of unique digests, H(QG), is reachable and indeed, equally probable. In terms of implementation area, the flow-hashing logic 600 may construct the family of unique digests, H(QG) with three small polynomial generators and a modest multiplication block.

As an alternative to multi-cycle, bit sequenced architecture noted above, the parser 502; first, second and third polynomial generators 504, 506 and 602; and computation module 510 may be implemented as one or more arrays of logic gates and/or random logic adapted to carry out the functionality of the flow-hashing logic 600 in a single cycle.

Figure 7:
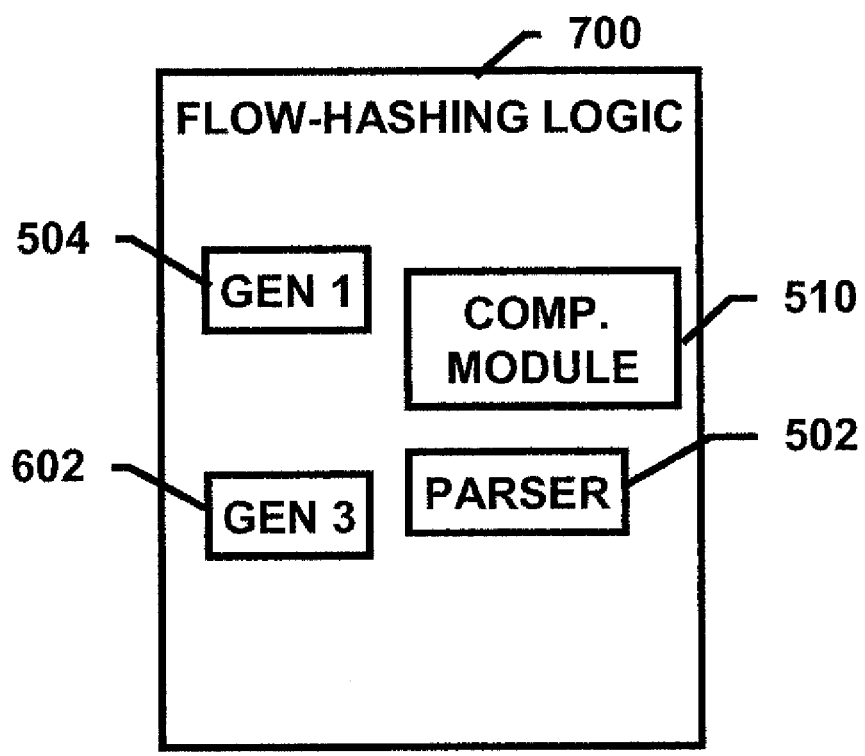
FIG. 7 is a block diagram illustrating example flow-hashing logic in accordance with one or more aspects.

FIG. 7 is a block diagram illustrating an example flow-hashing logic 700 in accordance with one or more aspects. The flow-hashing logic 700 is similar to the flow-hashing logic 500 of FIG. 5 and the flow-hashing logic 600 of FIG. 6, except as described herein.

The flow-hashing logic 700 may include the parser 502, the first and third polynomial generators 504, 602, and the computation module 510. The flow-hashing logic 700 omits the second polynomial generator 506.

Operationally, the flow-hashing logic 700 may pass a received dataflow packet to the parser 502. The parser 502 may then parse the flow identifiers from the internetwork and/or transport headers of the dataflow packet, and arrange them, for example, as the 5-tuple, so as to form the flow key. The parser 502 may pass the flow key to the computation module 510.

The computation module 510 may compute the first and third raw hash digests, X1 and Xr, as noted above. Thereafter, the computation module 510 may convert the third raw hash digest, Xr, to the pseudorandom rotation code, R (EQ. 6).

The computation module 510 may thereafter compute one of a family of hash digests, H(LQG), as the flow hash digest as follows:

$$H(LQG) = X1 * R | G1 \qquad (8)$$

where, X1 is the first raw hash digest; R is the pseudorandom rotation code; $R|G1$ is carried out using R modulo GF(2) polynomial G1 to form Y, and $X1*Y$ is carried out using GF(2) polynomial multiplication.

Once computed, the computation module 510 may pass the flow hash digest to the flow-hashing logic 700. The flow-hashing logic 700 may use the flow hash digest to render the forwarding decisions, as described above.

Analogous to the flow-hashing logic 600, the flow-hashing logic 700 may be used to construct indefinite numbers of unique digests, H(LQG) (limited only by the periods of the first and third polynomial generators 504, 602). To allow each of the interconnect nodes $420_1$-$420_4$ or each layer of the network 400 to render independent forwarding decisions, each of the interconnect nodes $420_1$-$420_4$ or each layer of the network 400 computes, on a packet-by-packet basis, one of the unique pseudorandom rotation codes, R. The pseudorandom rotation code, R, is then used to generate unique delays, and in turn, choose unique members of the constructed family of unique digests, H(LQG). Using the unique pseudorandom rotation code, R, to select among a large number of other linear hash digests, namely X1, results in the flow hash digest being very long, substantially nonlinear, and in turn, exhibiting good uniformity. Changing any bit in the unique pseudorandom rotation code, R, may result in a nearly random hash syndrome, provided any other differences exist in the flow key.

Because the period of the third polynomial generator 602 is relatively prime to the period of the first polynomial generators 504, every possible rotation of every state of the constructed family of unique digests, H(LQG), is reachable and indeed, equally probable. In terms of implementation area, the flow-hashing logic 700 may construct the family of unique digests, H(LQG), with two small polynomial generators and a modest multiplication block.

As an alternative to multi-cycle, bit sequenced architecture noted above, the parser 502; first and third polynomial generators 504 and 602; and computation module 510 may be implemented as one or more arrays of logic gates and/or random logic adapted to carry out the functionality of the flow-hashing logic 700 in a single cycle.

CONCLUSION

Those skilled in the art will appreciate that the features of the present technology may be combined into further embodiments without departing from the scope of the technology. In view of the wide variety of embodiments that can be applied, it should be understood that the illustrated embodiments are exemplary only, and should not be taken as limiting.

Moreover, except as otherwise stated, the terms "packet" and/or "packets" in the foregoing disclosure are used to encompass any type of packet structure, including, for example, datagrams, frames, packets and other like-type structures. In addition, the foregoing description along with the figures appended hereto describe, note and/or denote processing platforms, computing systems, controllers, and other devices containing processors. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It should be understood that the exemplary embodiments are not limited to the above-mentioned memories and that other platforms and memories may support the described methods.

It will be apparent to one of ordinary skill in the art that aspects of the technology, as described above, may be implemented in many different forms of software, firmware, and hardware in the implementations illustrated in the figures. The actual software code or specialized control hardware used to implement aspects consistent with the present technology is not limiting. Thus, the operation and behavior of the aspects were described without reference to the specific software code or hardware logic. It should be understood that a person of ordinary skill in the art would be able to design software and control hardware to implement the aspects described herein.

No element, act, or instruction used in the foregoing description should be construed as critical or essential to the technology unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items.

What is claimed is:

1. A method comprising:
   obtaining, at a network node, a key for a packet;
   forming, at the network node, a first pseudorandom number as a function of a first polynomial generator and the key;
   forming, at the network node, a second pseudorandom number as a function of a second polynomial generator and the key;
   combining, at the network node, the first and the second pseudorandom numbers to form a third pseudorandom number, wherein combining the first and the second pseudorandom numbers to form the third pseudorandom number comprises invoking at least one polynomial operation where the first and the second pseudorandom numbers are operands for the at least one polynomial operation; and
   selecting, at the network node, as a function of the third pseudorandom number, a path to which to forward the packet, wherein:
   the third pseudorandom number comprises a most significant byte and a least significant byte; and
   selecting the path as a function of the third pseudorandom number comprises selecting the path based on the most significant byte of the third pseudorandom number.

2. The method of claim 1, wherein the key comprises at least one bit from a header of the packet.

3. The method of claim 2, wherein the at least one bit comprises at least one bit selected from any of a source internet-protocol address, destination internet-protocol addresses, source transmission-control-protocol-port number, destination transmission-control-protocol-port number, and network protocol of the header of the packet.

4. The method of claim 1, wherein forming a first pseudorandom number comprises: forming, at the network node, a first hash value by applying the key to a first hash function, and wherein forming a second pseudorandom number comprises: forming, at the network node, a second hash value by applying the key to a second hash function.

5. The method of claim 4, wherein the first and second hash functions are first and second cyclic redundancy checks.

6. The method of claim 4, wherein the first and second hash functions have different periods.

7. The method of claim 1, wherein combining the first and second pseudorandom numbers comprises: using any of polynomial addition, polynomial multiplication, polynomial subtraction, modulo and finite field operations to combine the first and second pseudorandom numbers.

8. A method comprising:
obtaining, at a network node, a key for a packet;
forming, at the network node, a first pseudorandom number as a function of a first polynomial generator and the key;
forming, at the network node, a second pseudorandom number as a function of a second polynomial generator and the key;
forming, at the network node, a rotation code equal to one of a number of rotations of the first polynomial generator;
combining, at the network node, the first pseudorandom number, the second pseudorandom number and the rotation code to form a third pseudorandom number, wherein combining the first pseudorandom number, the second pseudorandom number, and the rotation code to form the third pseudorandom number comprises invoking at least one polynomial operation where the first pseudorandom number, the second pseudorandom number, and the rotation code are operands for the at least one polynomial operation; and
selecting, at the network node, as a function of the third pseudorandom number, a path to which to forward the packet, wherein:
the third pseudorandom number comprises a most significant byte and a least significant byte; and
selecting the path as a function of the third pseudorandom number comprises selecting the path based on the most significant byte of the third pseudorandom number.

9. The method of claim 8, wherein both of the first and second polynomial generators are primitive and have the same period.

10. The method of claim 9, wherein forming a rotation code comprises: forming, at the network node, a fourth pseudorandom number as a function of a fourth polynomial generator and the key.

11. The method of claim 10, wherein the fourth polynomial generator is relatively prime to the first and second polynomial generators, and wherein forming a rotation code further comprises: converting the fourth pseudorandom number to a pseudorandom rotation.

12. A method comprising:
obtaining, at a network node, a key for a packet;
forming, at the network node, a first pseudorandom number as a function of a first polynomial generator and the key;
forming, at the network node, a rotation code equal to one of a number of rotations of the first polynomial generator;
combining, at the network node, the first pseudorandom number and the rotation code to form a second pseudorandom number, wherein combining the first pseudorandom number and the rotation code to form the second pseudorandom number comprises invoking at least one polynomial operation where the first pseudorandom number and the rotation code are operands for the at least one polynomial operation; and
selecting, at the network node, as a function of the second pseudorandom number, a path to which to forward the packet, wherein:
the second pseudorandom number comprises a most significant byte and a least significant byte; and
selecting the path as a function of the second pseudorandom number comprises selecting the path based on the most significant byte of the second pseudorandom number.

13. The method of claim 12, wherein forming a rotation code comprises: forming, at the network node, a third pseudorandom number as a function of a second polynomial generator and the key.

14. The method of claim 13, wherein the second polynomial generator is relatively prime to the first polynomial generator, and wherein forming a rotation code further comprises: converting the second pseudorandom number to a pseudorandom rotation.

15. The method of claim 14, wherein the first polynomial generator is primitive and has a first period, and wherein second polynomial generator is primitive and has a second period.

16. An apparatus comprising:
memory operable to store executable instructions; and
a processor operable to obtain the executable instructions from memory and execute the executable instructions to:
obtain a key for a packet;
form a first pseudorandom number as a function of a first polynomial generator and the key;
form a second pseudorandom number as a function of a second polynomial generator and the key;
combine the first and the second pseudorandom numbers to form a third pseudorandom number, wherein the processor combines the first and the second pseudorandom numbers to form the third pseudorandom number by invoking at least one polynomial operation where the first and the second pseudorandom numbers are operands for the at least one polynomial operation; and
select, as a function of the third pseudorandom number, a path to which to forward the packet, wherein:
the third pseudorandom number comprises a most significant byte and a least significant byte; and
selection of the path as a function of the third pseudorandom number comprises selection of the path based on the most significant byte of the third pseudorandom number.

17. The apparatus of claim 16, wherein the key comprises at least one bit from a header of the packet.

18. The apparatus of claim 17, wherein the at least one bit comprises at least one bit selected from any of a source internet-protocol address, destination internet-protocol addresses, source transmission-control-protocol-port number, destination transmission-control-protocol-port number, and network protocol of the header of the packet.

19. The apparatus of claim 16, wherein the executable instructions to form a first pseudorandom number comprise executable instructions to: form a first hash value by applying the key to a first hash function, and wherein the executable instructions to form a second pseudorandom number comprises executable instructions to: form a second hash value by applying the key to a second hash function.

20. The apparatus of claim 19, wherein the first and second hash functions are first and second cyclic redundancy checks.

21. The apparatus of claim 19, wherein the first and second hash functions have different periods.

22. The apparatus of claim 16, wherein the executable instructions to combine the first and second pseudorandom numbers comprises executable instruction to: combine the first and second pseudorandom numbers using any of polynomial addition, polynomial multiplication, polynomial subtraction, modulo and finite field operations.

23. A system comprising:
a parsing circuit configured to obtain a key for a packet; and
a memory in communication with the parsing circuit and a processor, the memory comprising logic that, when executed by the processor, causes the processor to:
form a first pseudorandom number as a function of a first polynomial generator and the key;
form a second pseudorandom number as a function of a second polynomial generator and the key;
form a rotation code equal to one of a number of rotations of the first polynomial generator;
combine the first pseudorandom number, the second pseudorandom number and the rotation code to form a third pseudorandom number, wherein the processor combines the first pseudorandom number, the second pseudorandom number, and the rotation code using by invoking at least one polynomial operation, where the first pseudorandom number, the second pseudorandom number, and the rotation code are operands for the at least one polynomial operation; and
select, as a function of the third pseudorandom number, a path to which to forward the packet, wherein:
the third pseudorandom number comprises a most significant byte and a least significant byte; and
selection of the path as a function of the third pseudorandom number comprises selection of the path based on the most significant byte of the third pseudorandom number.

24. The system of claim 23, wherein both of the first and the second polynomial generators are primitive and have the same period.

25. The system of claim 24, wherein memory further comprises logic configured to form a fourth pseudorandom number as a function of a fourth polynomial generator and the key.

26. The system of claim 25, wherein the fourth polynomial generator is relatively prime to the first and the second polynomial generators, and wherein the memory further comprises logic configured to convert the fourth pseudorandom number to a pseudorandom rotation.

27. A networking equipment comprising:
a parsing circuit configured to obtain a key for a packet; and
a memory in communication with the parsing circuit and a processor, the memory comprising logic that, when executed by the processor, causes the processor to:
form a first pseudorandom number as a function of a first polynomial generator and the key;
form a rotation code equal to one of a number of rotations of the first polynomial generator;
combine the first pseudorandom number and the rotation code to form a second pseudorandom number, where the processor combines the first pseudorandom number and the rotation code by invoking at least one polynomial operation, where the first pseudorandom number and the rotation code are operands for the at least one polynomial operation; and
select, as a function of the second pseudorandom number, a path to which to forward the packet, wherein:
the second pseudorandom number comprises a most significant byte and a least significant byte; and
selection of the path as a function of the second pseudorandom number comprises selection of the path based on the most significant byte of the second pseudorandom number.

28. The networking equipment of claim 27, wherein the memory further comprises logic configured to form a third pseudorandom number as a function of a second polynomial generator and the key.

29. The networking equipment of claim 27, wherein the second polynomial generator is relatively prime to the first polynomial generator, and wherein the memory further comprises logic configured to convert the second pseudorandom number to a pseudorandom rotation.

30. The networking equipment of claim 29, wherein the first polynomial generator is primitive and has a first period, and wherein second polynomial generator is primitive and has a second period.

* * * * *